(12) United States Patent
Tillier

(10) Patent No.: US 9,262,235 B2
(45) Date of Patent: Feb. 16, 2016

(54) MESSAGING INTERRUPTIBLE BLOCKING WAIT WITH SERIALIZATION

(75) Inventor: Fabian Samuel Tillier, Portland, OR (US)

(73) Assignee: Microsoft Technology Licensing, LLC, Redmond, WA (US)

(*) Notice: Subject to any disclaimer, the term of this patent is extended or adjusted under 35 U.S.C. 154(b) by 343 days.

(21) Appl. No.: 13/082,205

(22) Filed: Apr. 7, 2011

(65) Prior Publication Data

US 2012/0260262 A1    Oct. 11, 2012

(51) Int. Cl.
| | |
|---|---|
| G06F 3/00 | (2006.01) |
| G06F 9/46 | (2006.01) |
| G06F 9/52 | (2006.01) |
| G06F 9/54 | (2006.01) |
| H04L 12/64 | (2006.01) |

(52) U.S. Cl.
CPC .............. G06F 9/526 (2013.01); G06F 9/546 (2013.01); H04L 12/6418 (2013.01)

(58) Field of Classification Search
None
See application file for complete search history.

(56) References Cited

U.S. PATENT DOCUMENTS

| | | | |
|---|---|---|---|
| 6,560,626 B1 | 5/2003 | Hogle et al. | |
| 6,742,051 B1 * | 5/2004 | Bakshi et al. | 719/318 |
| 6,799,317 B1 * | 9/2004 | Heywood et al. | 719/313 |
| 7,694,310 B2 | 4/2010 | Huang et al. | |
| 7,703,103 B2 | 4/2010 | Spiegl et al. | |
| 7,765,547 B2 | 7/2010 | Cismas et al. | |
| 7,849,297 B2 | 12/2010 | Kissell | |
| 2002/0087769 A1 * | 7/2002 | McKenney et al. | 710/200 |
| 2004/0186931 A1 * | 9/2004 | Maine | 710/22 |
| 2007/0294663 A1 | 12/2007 | McGuire et al. | |
| 2008/0209422 A1 * | 8/2008 | Coha | 718/102 |
| 2009/0055836 A1 | 2/2009 | Supalov | |
| 2009/0172686 A1 | 7/2009 | Chen et al. | |
| 2009/0177829 A1 * | 7/2009 | Worthington et al. | 710/267 |
| 2009/0307463 A1 | 12/2009 | Kanoh | |
| 2010/0100703 A1 | 4/2010 | Basu et al. | |

OTHER PUBLICATIONS

Gropp et al.; "MPI: A Message-Passing Interface Standard Version 2.2"; Sep. 4, 2009; Message Passing Interface Forum.*
"Alertable I/O", Retrieved at <<http://msdn.microsoft.com/en-us/library/aa363772%28v=vs.85%29.aspx>>, Retrieved Date: Feb. 23, 2011, pp. 1-2.

(Continued)

*Primary Examiner* — Umut Onat
(74) *Attorney, Agent, or Firm* — Ben Tabor; Kate Drakos; Micky Minhas

(57) ABSTRACT

Enhanced message passing architectures and libraries include an interruptible wait feature. After a thread X calls a completion-awaiting routine of a message passing interface library, a progress engine executes while the routine is in the blocked condition. A thread Y interrupts the routine before all messaging operations are completed. The interrupted routine returns control to thread X with an indication that the routine's completion condition is unsatisfied. The completion-awaiting routine may have the same function signature as a standard MPI routine. In some cases, thread Y interrupts the routine while requesting a lock held by thread X. In some applications, thread X is a communication thread and thread Y is one of multiple worker threads. The interruptible wait feature may be joined by an asynchronous callback feature, which associates a callback with a deterministic execution context.

20 Claims, 7 Drawing Sheets

(56) References Cited

OTHER PUBLICATIONS

"Windows Programming Models", Retrieved at <<http://www.comptek.ru/telephony/sr/gcapdvgd/1526-02-11.html>>, Retrieved Date: Feb. 23, 2011, pp. 1-6.

"Asynchronous Calls in .NET", Retrieved at <<http://www.devx.com/codemag/Article/16107/1954>>, Retrieved Date?: Feb. 23, 2011, pp. 1-12, Juval Löwy.

"Asynchronous Procedure Calls", Retrieved at <<http://msdn.microsoft.com/en-us/library/ms681951%28v=vs.85%29.aspx>>, Retrieved Date: Feb. 23, 2011, pp. 1-2.

Majumder, et al., "An Event-Driven Architecture for MPI Libraries", Retrieved at <<http://citeseerx.ist.psu.edu/viewdoc/summary?doi=10.1.1.117.3484>>, In the Proceedings of the Los Alamos Computer Science Institute Symposium, 2004, pp. 1-15.

Fong, Pamela, "Asynchronous Processing in WebSphere Process Server", Retrieved at <<http://www.ibm.com/developerworks/websphere/library/techarticles/0904_fong/0904_fong.html, Apr. 29, 2009, pp. 1-29.

"Design and Interface Overview", Retrieved at <<http://mpi4py.scipy.org/docs/usrman/mpi4py.html>>, Retrieved Date: Feb. 24, 2011, pp. 1-8.

"Synchronizing Data for Multithreading", Retrieved at <<http://msdn.microsoft.com/en-us/library/z8chs7ft%28v=vs.71%29.aspx>>, Retrieved Date: Feb. 24, 2011, pp. 1-3.

"Operating Systems", Retrieved at <<http://www.cs.nyu.edu/courses/spring05/G22.2250-001/lectures/lecture-04.html>>, Retrieved Date: Feb. 24, 2011, pp. 1-9.

"Performance Programming", Retrieved at <<http://download.oracle.com/docs/cd/E19061-01/hpc.cluster5/817-0090-10/prog.html>>, Retrieved Date: Feb. 24, 2011, pp. 1-28.

Wheeler, et al., "Qthreads: An API for Programming with Millions of Lightweight Thread", Retrieved at <<http://www.sandia.gov/~rcmurph/doc/qt_paper.pdf>>,This paper appears in: Parallel and Distributed Processing, IEEE International Symposium, Apr. 14-18, 2008, pp. 1-8.

Hoefler, et al., "Efficient MPI Support for Advanced Hybrid Programming Models", Retrieved at <<http://greg.bronevetsky.com/papers/2010EuroMPI.pdf>>, In the Proceedings of the 17th European MPI users' group meeting conference on Recent advances in the message passing interface, 2010, pp. 1-10.

"Message passing", Retrieved at <<http://en.wikipedia.org/wiki/Message_passing>>, Mar. 11, 2011, pp. 1-5.

"Message Passing Interface", Retrieved at <<http://en.wikipedia.org/wiki/Message_Passing_Interface>>, Feb. 14, 2011, pp. 1-11.

"WSASend Function (Windows)", Retrieved at <<http://msdn.microsoft.com/en-us/library/ms742203(v=vs.85).aspx>>, Dec. 21, 2007-Mar. 17, 2011, pp. 1-11.

"International Search Report", Mailed Date: Dec. 21, 2012, Application No. PCT/US2012/032633, Filed Date: Apr. 6, 2012, pp. 9.

* cited by examiner

US 9,262,235 B2

MESSAGING INTERRUPTIBLE BLOCKING WAIT WITH SERIALIZATION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Message Passing Interface (MPI) is a group of language-independent Application Program Interface (API) specifications which define protocols for software processes to communicate with one another by sending and receiving messages. MPI is a de facto standard, unsanctioned at present by any major standards body. A variety of MPI specification versions and MPI implementations exist, many of which are directed at multi-threaded and/or parallel programs. MPI is widely used in High-Performance Computing (HPC) environments.

SUMMARY

In some messaging architectures, significant processor time can be expended checking for requests in order to avoid indefinitely blocking progress. Some embodiments described herein provide an approach which enhances a message passing architecture by providing an interruptible wait feature.

In some embodiments, a thread X calls a completion-awaiting routine of a message passing interface library. The called completion-awaiting routine would return successfully from a blocked condition after a specified message passing completion condition is satisfied; the completion condition has a list of requests, such as messaging operation(s) and/or other message passing interface library requests, which have not yet been completed. A message passing interface library progress engine executes while the completion-awaiting routine is in the blocked condition. At some point prior to satisfaction of the completion condition, a thread Y interrupts the completion-awaiting routine. The interrupted completion-awaiting routine returns control to thread X in conjunction with an indication that none of the listed requests have completed, for instance, or with another indication that the completion condition is unsatisfied. In some cases the indications specifies the extent to which the completion condition is (un)satisfied. In some cases, the completion-awaiting routine is a wait-some routine which has a list of message passing operations and which is configured to return from the blocked condition after a completion of processing occurs on at least one of the listed operations.

In some embodiments, a thread Y interrupts the completion-awaiting routine in conjunction with requesting a lock held by thread X. More generally, some embodiments utilize a lock, such as a FIFO lock, for serializing thread calls to the message passing interface library.

In some enhanced MPI architectures, thread X is a communication thread and thread Y is one of multiple worker threads, or vice versa. The threads of an application may belong to processes which are organized in ranks, with an enhanced MPI library used to pass messages between the ranks. An enhanced MPI architecture may comply with a standard such as MPIMPI_THREAD_FUNNELED and/or MPI_THREAD_SERIALIZED. In some embodiments, the completion-awaiting routine has the same function signature as a standard MPI waitsome routine, or another standard MPI routine.

In some embodiments, an interruptible wait enhancement is accompanied by an asynchronous callback enhancement. For example, some embodiments include an asynchronous callback configuring a memory. The callback has a deterministic thread callback context which associates the callback with a thread identified in a messaging request, thereby determining the thread in which the callback will execute. In some embodiments, the thread identified in the messaging request also has a state indicator which indicates whether the thread is executing in an open state in which the thread will execute asynchronous callbacks.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
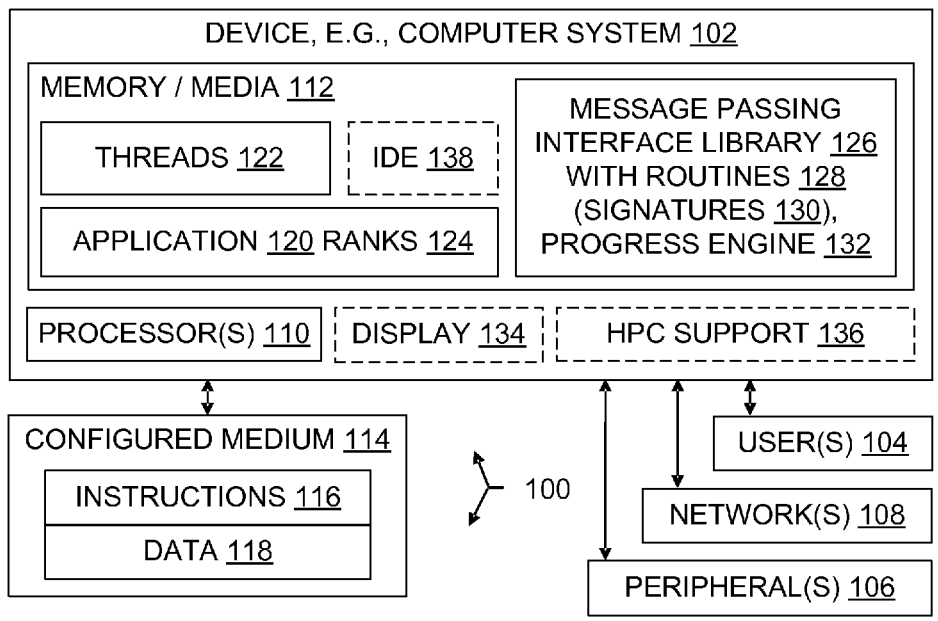
FIG. 1 is a block diagram illustrating a computer system having multiple processors, memory, software threads, an MPI library, and other items in an operating environment which may be present on multiple network nodes, and also illustrating configured storage medium embodiments.

Although MPI is widely used, available MPI approaches could be enhanced in helpful ways. Two kinds of MPI enhancements presented here are referred to generally as "asynchronous callback" enhancements and as "interruptible wait" enhancements, respectively. Each may be added and used without the other, or they may both be added and used in a given embodiment.

With regard to asynchronous callback, familiar MPI approaches lack suitable support for callback driven completion notifications for MPI requests. Users instead explicitly test or wait on a non-blocking request to detect completion.

Callback driven completion notifications are problematic because they would traditionally occur in the context of an existing MPI call, restricting what calls the application can perform in the callback. An MPI implementation could use threads to invoke the callback, but this might break applications by making a single threaded application suddenly multithreaded. Accordingly, asynchronous callback enhancements like those provided herein offer a helpful alternative.

With regard to interruptible wait, familiar MPI specifications provide two modes of checking for non-blocking request completion: blocking on one or more requests via the MPI_Wait series of routines (MPI_Wait, MPI_Waitsome, MPI_Waitany, MPI_Waitall), or testing for completion of one or more requests via the MPI_Test series of routines (MPI_Test, MPI_Testsome, MPI_Testany, MPI_Testall.) The MPI_Wait calls all block the calling thread until the wait condition is satisfied. The MPI_Test calls check for request completion but do not block the calling thread. In a multithreaded MPI application or other implementation using the MPI_THREAD_SERIALIZED threading model, threads normally should not block indefinitely, and thus they call MPI_Iprobe or one of the MPI_Test functions in a loop to check for incoming messages while still remaining responsive to other threads in the application. As a result, one might insist that MPI implementations support MPI_THREAD_MULTIPLE, allowing concurrent calls by multiple threads. However, the locking overhead of implementing thread safety may regress performance for single threaded applications or applications that already implement their own thread serialization techniques. Accordingly, interruptible wait enhancements like those provided herein offer a helpful alternative.

Some embodiments described herein may be viewed in a broader context. For instance, concepts such as asynchrony, callbacks, completion, messaging, interruption, or serialization may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving asynchrony, callbacks, completion, messaging, interruption, and/or serialization are outside the present scope. Accordingly, vagueness and accompanying proof problems are also avoided under a proper understanding of the present disclosure.

With respect to asynchronous callback, some embodiments described herein introduce non-blocking send and receive functions, MSMPI_Isend_apc and MSMPI_Irecv_apc, that allow one to avoid waiting for completion explicitly. Instead, any thread making progress that completes an outstanding asynchronous procedure request, such as an APC request, queues a user-mode asynchronous callback (such as an APC) to the initiating thread. The asynchronous callback executes outside of the context of any MPI call whenever the requesting thread enters an alertable state. As used herein, "APC" refers to a particular kind of asynchronous routine, namely, one provided in some Microsoft® operating environments, which executes asynchronously in the context of a particular thread. The use of an alertable state is linked in some environments to APCs, but is conceptually separable from the use of asynchronous routines which execute in the context of a particular thread.

Unlike traditional callback models, these asynchronous callback enhancements provide one or both of the following aids. First, the thread that initiated the request executes the callback, regardless of which thread detected the request as being complete. This gives the application a deterministic thread context in which the callback runs, something traditional callback models fail to provide. Second, the thread that initiates the request controls when the callbacks can execute by putting itself in a receptive (e.g., Alertable wait) state, allowing the application to delay executing callbacks until it is outside of logically related sections of code.

With respect to interruptible wait, some embodiments described herein introduce a wait function, MSMPI_Waitsome_interruptible, that allows an application to make strong progress without the potential for deadlock. To complement this function, and to allow the client application to interrupt an outstanding call to MSMPI_Waitsome_interruptible, some embodiments also introduce the synchronization functions MSMPI_Queuelock_acquire and MSMPI_Queuelock_release. These synchronization functions allow applications to implement proper serialization to MPI calls between threads while at the same time properly interrupting any outstanding MSMPI_Waitsome_interruptible calls.

Allowing threads to interrupt another thread's blocking call allows hybrid/multithreaded applications to make strong progress while still being responsive to local messaging requirements. Providing serialization and wait interruption as an atomic operation helps applications avoid potential race conditions between threads trying to access the MPI implementation. This design allows applications to use multithreading while at the same time giving higher performance than could likely be achieved with MPI_THREAD_MULTIPLE support. The enhancement may also eliminate the overhead of internal MPI threads and potential oversubscription of cores of an MPI implementation that uses one or more internal progress threads.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple threads of execution. The term "thread" should be understood to include any code capable of or subject to scheduling (and possibly to synchronization). In some cases, a thread may also be known by another name, such as "task," "process," or "coroutine," for example. In some cases, such as many MPI development contexts, a distinction is made between a "thread" and a "process" in that a process may have multiple threads. In general, threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

A "routine" can be a function (which returns a value) or a procedure (which does not). Routines are an example of code.

"Calling" and "invoking" are used interchangeably herein with regard to routines.

An "API" is an interface to one or more routines, which specifies at least the parameter(s) to be passed when calling the routine(s).

A "library" is a collection of routines which can be invoked from other code. A library can export routines through an API, for example, to be called by one or more threads.

An "MPI standard" is any version of any standard or MPI specification published by the Message Passing Interface Forum.

A "message passing interface library" is a library which implements at least one message passing routine, such as for example a routine defined in at least one MPI standard, or another routine for communication between threads by way of message passing.

"Program" is used broadly herein, to include applications, kernels, drivers, interrupt handlers, libraries, and other code written by programmers (who are also referred to as developers).

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

A "lock" is a flag, counter, queue, semaphore, mutex, or other program object that negotiates mutual exclusion among threads. Locks are used to control thread access to a common resource, e.g., to serialize access to a resource that is used by multiple threads.

Throughout this document, use of the optional plural "(s)" means that one or more of the indicated feature is present. For example, "thread(s)" means "one or more threads" or equivalently "at least one thread".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "accessing", "associating", "calling", "detecting", "displaying", "interrupting", "invoking", "sending", "transmitting", or "utilizing" with regard to a destination or other subject may involve intervening action such as forwarding, copying, uploading, downloading, encoding, decoding, compressing, decompressing, encrypting, decrypting, authenticating, communicating, and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110, and generally includes multiple processors 110 as shown in the example of FIG. 1. The computer system 102, like other suitable systems, also includes one or more computer-readable storage media 112. Media 112 may be of different physical types. The media 112 may be volatile memory, non-volatile memory, fixed in place media, removable media, magnetic media, optical media, and/or of other types of media as opposed to media merely a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by asynchronous callback and/or interruptible wait as discussed herein.

An application 120 having threads 122 organized in process ranks 124, a message passing interface library 126 with routines 128 having signatures 130 and with a progress engine 132, and other items shown in the Figures and/or discussed in the text may reside partially or entirely within one or more media 112, thereby configuring those media. An operating environment may also include a display 134 and other hardware, such as buses, power supplies, and accelerators, for instance.

High Performance Computing (HPC) support 136 in the form of a kernel, parallel programming development tools, and/or parallel processing hardware, for example, may be present. A given operating environment 100 may include an Integrated Development Environment (IDE) 138 which provides a developer with a set of coordinated software development tools. In particular, some of the suitable operating environments for some embodiments include or help create a Microsoft® Visual Studio® development environment (marks of Microsoft Corporation) configured to support HPC program development.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
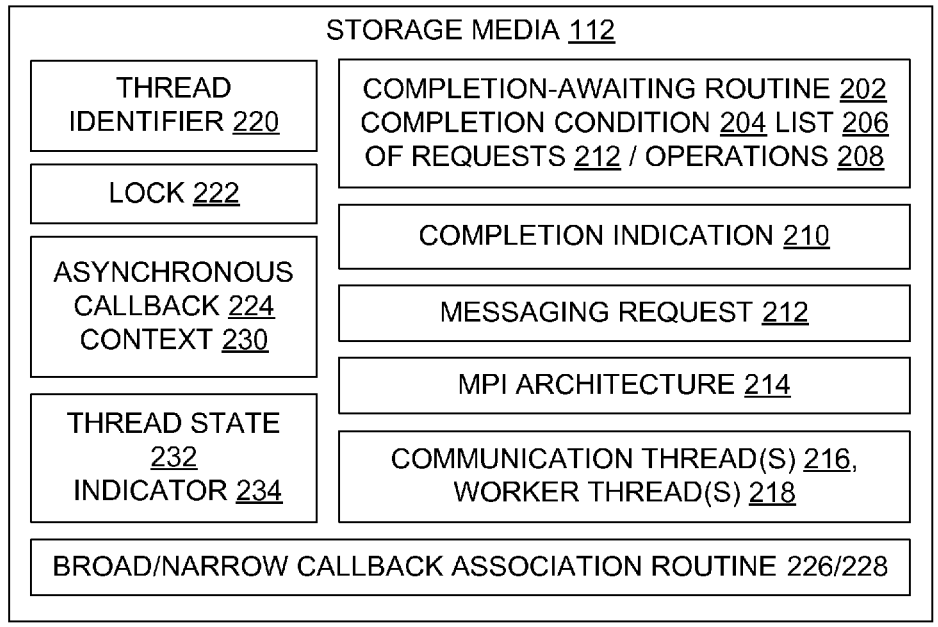
FIG. 2 is a block diagram illustrating asynchronous callback and interruptible wait aspects of an enhanced MPI library in an example architecture.

FIG. 2 illustrates an architecture which is suitable for use with some embodiments. An enhanced MPI library 126 includes a completion-awaiting routine 202 which has a completion condition 204 including a list 206 of messaging operations 208. Upon the completion-awaiting routine's return, a completion indication 210 indicates the extent and in some cases the details of the satisfaction (or lack thereof) of the completion condition 204.

More generally, some embodiments include messaging requests 212 created and processed within an MPI architecture 214 which includes threads 122 and an MPI library 126. In some MPI architectures 214, threads of interest belong to an application 120 and are assigned a role as a communication thread 216 or as a (non-MPI) computational worker thread 218. Threads 122 are identified by thread identifiers 220. In some embodiments, threads can be serialized using a lock 222, which may include one or more mutexes, flags, or other individual variables.

In some embodiments, an asynchronous callback 224 is associated with a thread 122, e.g., by using a broad callback association routine 226 that associates a given callback with any of a predetermined group of several library 126 routines 128, or by using a narrow callback association routine 228 that associates a given callback with a predetermined specific library 126 routine 128 (in which case different routines 128 would have different respective narrow callback association routines 228). The callback 224 will execute in its associated thread's context 230. In some cases, callbacks can execute only when a thread's state 232 is open to callback execution, as specified in a thread state indicator 234.

With regard to asynchronous callback, a familiar pattern used in some hybrid MPI/multi-threaded applications 120 is that each rank 124 has one MPI communication thread 216 and multiple non-MPI worker threads 218. The number of worker threads is often N−1, where N is the number of cores on a host or NUMA (non-uniform memory access/non-uniform memory architecture) node. The threads interact through message queues. For instance, one queue may hold requests from worker threads like "fetch me block 51" when data block 51 is owned by another rank, while another queue holds replies like "send requested block 51". Each rank 124 may request some blocks and satisfy block requests from others. The communication thread 216 deals asynchronously with both the MPI library 126 and other threads 122. A familiar message flow may thus span across nodes (A,B, . . . ) as well as threads (X,Y, . . . where X is the communication thread): e.g., A:Z→A:X→B:X→B:Y→B:X→A:X→A:Z. With some embodiments using asynchronous callback enhancements, such a message flow is modified to become A:Z→B:X→B:Y→A:Z.

In some embodiments, an MPI implementation processes outstanding requests 212 in the context of application calls into the MPI library 126. The application 120 thus controls the thread context 230 in which I/O progress is made. An MPI standard states that progress is made on outstanding requests when the application requests completion of any request (e.g., MPI Standard version 2.2, section 3.7, page 57, cited here for background information only and not for incorporation by reference.) When an application initiates a non-blocking send (e.g., using an MSMPI_Isend_apc routine 128) or receive (e.g., using an MSMPI_Irecv_apc routine 128), one MPI implementation (denoted here MSMPI) stores the requesting thread information 220 to allow it to queue a Windows Asynchronous Procedure Call (APC) callback 224 to the requesting thread when that request completes, independently from any explicit call to complete such requests. APCs are exposed to applications through the QueueUserAPC function. Different asynchronous callbacks 224 may be used in other implementations.

With regard to interruptible wait, an MPI standard supports multiple levels of threading in MPI implementations, as described in the following table:

| | |
|---|---|
| MPI_THREAD_SINGLE | The application may only have a single thread. |
| MPI_THREAD_FUNNELED | The application must make all MPI calls from a single thread |
| MPI_THREAD_SERIALIZED | The application must serialize calls to MPI, and only a single thread may call MPI at a time. |
| MPI_THREAD_MULTIPLE | The application may make concurrent calls to MPI from any thread. |

Like some other implementations, the MSMPI implementation supports up to MPI_THREAD_SERIALIZED, so multithreaded MPI applications serialize their access to MPI when using MSMPI. It will be understood by one of skill that implementing MPI_THREAD_MULTIPLE support is a large undertaking, with significant potential for regressing single-threaded performance.

In a familiar MPI architecture with hybrid MPI/multi-threaded applications as discussed above, the communication thread 216 does not use any blocking MPI calls because doing so would risk making the communication thread 216 unresponsive to requests from the compute threads 218. A familiar workaround is for the communication thread to loop, alternating between (a) calling MPI_Iprobe/MPI_Test to detect incoming messages and (b) checking the thread message queues. When a message is received from MPI, it is dispatched to the appropriate compute thread for processing. When a compute thread needs to request data or send the response to a request, it queues the outbound message to the communication thread. The communication thread then initiates all transfers on behalf of the compute threads. A result of this traditional design pattern is that a thread essentially busy-waits checking for I/O work to be done. If there is no I/O work to do, the thread ends up wasting a whole CPU. But with interruptible wait enhancements, the communication thread 216 is able to make strong progress (blocked in the MPI progress engine) while still being responsive to other threads that would make their own MPI calls or queue outbound messages to the communication thread.

With reference to FIGS. 1 and 2, some embodiments provide a computer system 102 with a logical processor 110 and a memory medium 112 configured by circuitry, firmware, and/or software to transform an MPI library and/or an MPI architecture by extending functionality with asynchronous callback enhancements and/or interruptible wait enhancements as described herein.

Some asynchronous callback embodiments include a computer system 102 with at least two logical processors 110, each logical processor in operable communication with a memory 112. At least two threads 122 reside in (and thus configure) the memory 112. An MPI messaging request 212 residing in the memory has a requesting thread identifier 220 which identifies one of the threads. The messaging request 212 also has a completion indicator 210 which indicates whether the messaging request has completed. An asynchronous callback 224 residing in the memory has a deterministic thread callback context 230, which associates the callback with the thread identified in the messaging request, thereby determining the thread in which the callback will execute.

In some embodiments, the thread identified in the messaging request also has a state indicator 234 which indicates one of the following when the thread is executing: a closed state 232 in which the thread will not execute asynchronous callbacks, an open state 232 in which the thread will execute asynchronous callbacks.

In some embodiments, the system includes an application 120 having at least two ranks 124 of processes. Each rank has a communication thread 216 and multiple worker threads 218. The thread identified in the messaging request 212 is a communication thread of one of the ranks.

In some embodiments, the memory contains a broad callback association routine 226, namely, a routine which is configured to set the deterministic thread callback context 230 (and often the callback as well) for any kind of non-blocking messaging request 212 that is recognized in the system. A routine is thus configured by virtue of structure, namely, data 118 and/or instructions 116 whose behavior can be accurately predicted by one of skill given its source code and a description of the system.

In some embodiments, the memory contains a narrow callback association routine 228. For example, one routine 228 sets the deterministic thread callback context for a persistent messaging request, one routine 228 sets context 230 for a synchronous send messaging request, another routine 228 sets context 230 for a ready send messaging request, and yet another routine 228 sets context 230 for a buffered send messaging request.

Building on some of the foregoing embodiments, in some cases the memory contains a message passing interface library 126 that is configured to process the messaging request 212 and to set the completion indicator 210 to indicate that the messaging request has completed. The deterministic thread callback context 230 in some embodiments includes a queue in which the callback is queued for execution by the thread identified in the messaging request.

Some interruptible wait embodiments include a computer system 102 with at least two logical processors 110, each logical processor in operable communication with a memory 112. At least two threads 122 reside in the memory 112. A message passing interface library progress engine 132 also resides in the memory, as does an unsatisfied completion condition 204 specifying a list 206 of messaging operation(s) 208 which have not yet been completed. An interruptible completion-awaiting routine 202 of a message passing interface library is also present in memory. The interruptible completion-awaiting routine 202 is configured (by its structure in the form of data and/or instructions) to return successfully from a blocked condition in the absence of interruption when the completion condition is satisfied.

In some embodiments, a completion-awaiting routine can be viewed as an enhancement of familiar MPI wait and waitsome routines. Some examples of unenhanced completion-awaiting routines are the familiar MPI_Wait( ) and MPI_Waitsome( ) routines. A completion-awaiting routine is configured to return successfully from a blocked condition after a specified message passing completion condition is satisfied. The completion condition may vary. For example, one MPI_Waitsome( ) routine may be configured to return success after at least one of a specified list of MPI send or receive operations completes, while another one MPI_Waitsome( ) routine is configured to return success after at least N (N>1) operations complete, and a third MPI_Waitsome( ) routine is configured to return success only after all of the operations complete. An MPI standard defines MPI_Waitsome as completing when at least one request completes. It can return with more than one completed request, unlike MPI_Waitany where only one request is complete at the time the call returns.

In a given embodiment, one or more enhanced MPI_Wait routines could be interrupted. Some embodiments focus on MPI_Waitsome because its familiar version has an output parameter indicating the number of requests that actually completed. In some embodiments, the MSMPI_Waitsome_interruptible routine 202 has the same function signature 130 as MPI_Waitsome, making it easier for some developers to grasp. The other familiar wait routines arguably don't support returning zero completions as naturally: MPI_Waitany always returns with 1, indicating which of the input requests completed. MPI_Waitall returns when all have completed, with no output indicating how many (it's implicitly 'N'). MPI_Wait only waits for a single request, and has no output parameters. In some embodiments, MPI error values may be leveraged for indicating an interruption, although by default some MPI implementations abort the process on any error unless overridden explicitly by the application.

However, any permutation of "wait-family" call(s) could be enhanced consistent with the teachings herein, even if the enhanced API signature 130 didn't match the non-interruptible familiar version. One way to describe the set of possible wait-family routines (waitsome, waitany, etc.) is according to what request(s) have completed upon a normal return:
 (a) At least 1 of a list of N has completed
 (b) Exactly 1 of a list of N has completed
 (c) At least 2 of a list of N have completed
 (d) Exactly 2 of a list of N have completed
 (e) Etc., up to at least N of a list of N/exactly N of a list of N have completed The foregoing contemplates all logical possibilities, even if only some of them happen to be part of any current MPI standard. All of these routines may be enhanced as completion-awaiting routines whose interruptible version returns with zero completions. It may happen that some enhanced completion-awaiting routines will be more frequently used, such as an interruptible version of MPI-waitsome, perhaps.

In some embodiments, one of the threads is a communication thread 216 of an application 120 having at least two ranks 124 of processes, and the other thread is a worker thread 218 of the application. Each process rank 124 has a communication thread and multiple worker threads in this embodiment.

Some embodiments include a lock 222 for use in serializing thread calls to the message passing interface library. Routines implementing a FIFO queue lock are discussed below as an example, but other embodiments may use different locks 222.

In some embodiments, the system 102 has an MPI architecture 214 that complies with a standard description such as MPI_THREAD_FUNNELED and/or MPI_THREAD_SERIALIZED. In some, the completion-awaiting routine 202 is enhanced with interruptible wait functionality but has the same function signature 130 as a standard MPI routine.

Some embodiments include both asynchronous callback and interruptible wait enhancements. For example, one system builds on one or more of the foregoing interruptible wait embodiments and also includes a messaging request 212 residing in the memory and having a requesting thread identifier 220 which identifies one of the threads, and an asynchronous callback 224 residing in the memory. The callback 224 has a deterministic thread callback context 230 which associates the callback with the thread identified in the messaging request, thereby determining the thread in which the callback will execute. In some embodiments, the thread identified in the messaging request also has a state indicator 234 which indicates one of the following when the thread is executing: a closed state 232 in which the thread will not execute asynchronous callbacks, an open state 232 in which the thread will execute asynchronous callbacks.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, processes of ranks 124 and MPI library routines 128 may run on multiple devices/systems 102 in a networked cloud.

Processes

Figure 3:
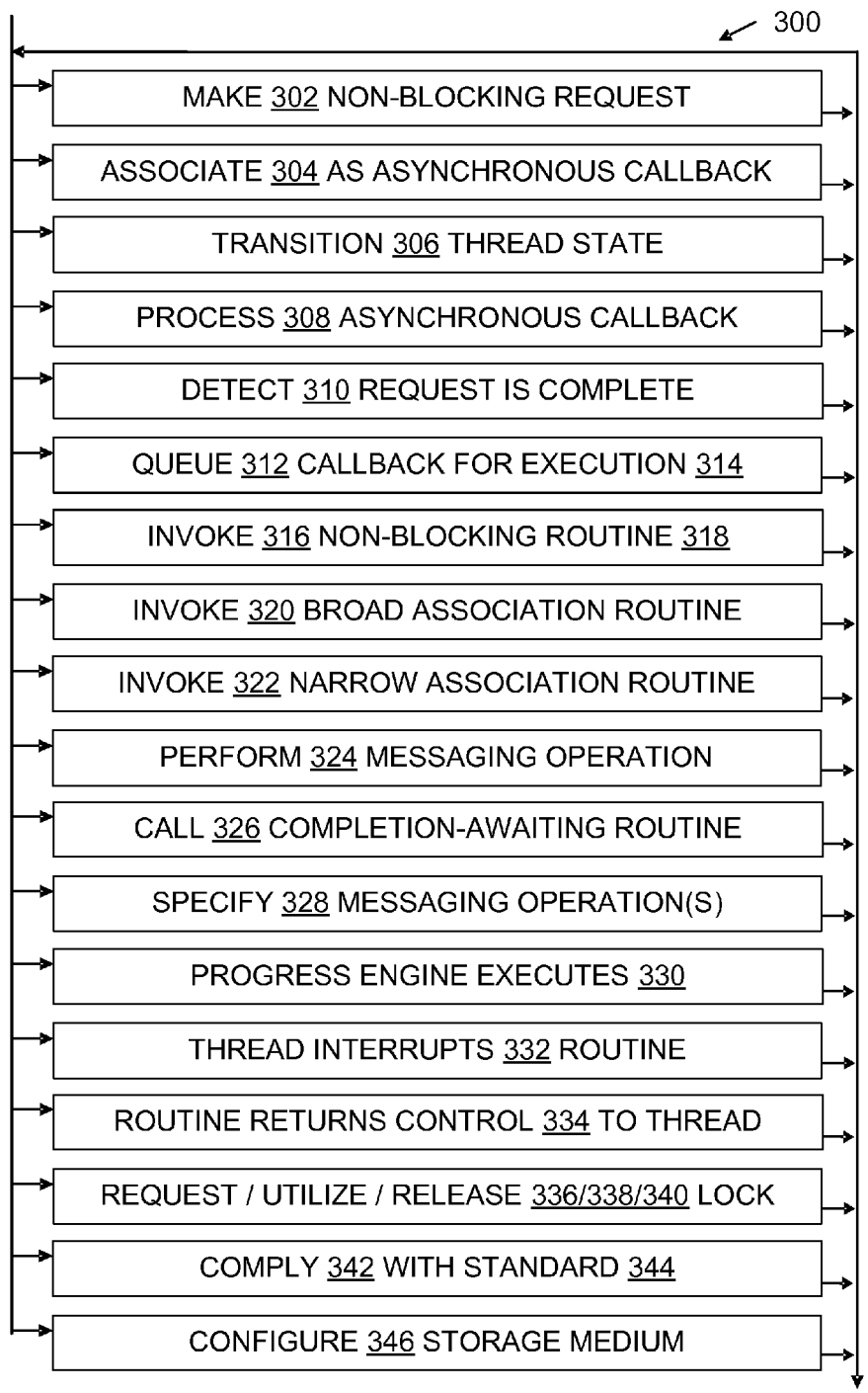
FIG. 3 is a flow chart illustrating steps of some process and configured storage medium embodiments.

FIG. 3 illustrates some process embodiments in a flowchart 300. Processes shown in the Figures may be performed in some embodiments automatically, e.g., by an application 120 under control of a script or otherwise requiring little or no contemporaneous user input as it executes in an enhanced MPI architecture 214. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a non-blocking request making step 302, an embodiment makes a non-blocking messaging request. Step 302 may be accomplished using calls to an enhanced MPI library, for example.

During an associating step 304, an embodiment associates an asynchronous callback 224 with a thread context 230 for execution in an enhanced MPI architecture, such as by calling an association routine 226, 228. In particular, an embodiment may associate 304 a callback routine with a request 212 as an asynchronous callback to a thread 122.

During a state transitioning step 306, an embodiment transitions a thread state 232 between a state that is open to execution to an asynchronous callback and one that is closed to such execution, such as by setting a flag or other indicator 234.

During a callback processing step 308, an embodiment processes a callback 224 by passing control to the callback in an associated execution context 230.

During a completion detecting step 310, an embodiment detects that a messaging operation 208 or other messaging request 212 has completed, such as by using familiar MPI completion detection mechanisms.

During a callback queueing step 312, an embodiment queues a callback for execution 314, such as by placing a pointer or other familiar callback identifier in a queue associated with a particular thread 122.

During a non-blocking routine invoking step 316, an embodiment invokes a non-blocking MPI library routine 318. Familiar parameter-passing and control-passing, and other familiar invocation mechanisms can be used, for example.

During a broad association routine invoking step 320, an embodiment invokes a broad callback association routine 226, which may be one of the enhancements to an MPI library 126, for example.

During a narrow association routine invoking step 322, an embodiment invokes a narrow callback association routine 228, which may be one of the enhancements to an MPI library 126, for example.

During a messaging operation performing step 324, an embodiment performs a messaging operation 208, such as a familiar or enhanced operation in an MPI architecture 214.

During a completion-awaiting routine calling step 326, an embodiment calls (i.e., invokes) a completion-awaiting routine 202, which may be one of the enhancements to an MPI library 126, for example.

During a messaging operation specifying step 328, an embodiment specifies a messaging operation 208, such as by including a familiar or enhanced operation in a completion condition list 206.

During an engine executing step 330, an MPI progress engine 132 executes.

During an interrupting step 332, a thread interrupts execution of a routine, such as a routine belonging to another thread.

During a control returning step 334, a routine returns control to a thread.

During respective steps, an embodiment requests 336 a lock 222, releases 340 a lock it has acquired, or otherwise (e.g., gains exclusive access to a shared resource based on) utilizes 338 a lock 222.

During a complying step 342, an embodiment complies with an MPI standard 344, e.g., by invoking a routine 202 which has the same function signature 130 as a familiar routine 128 but has a superset of the familiar routine's functionality. As used herein, "complies with a standard" and similar phrases mean that a standard's required function signatures and minimum required functionality are present; additional routines and/or additional functionality in routines that have standard function signatures may also be present. For example, one interruptible wait routine MSMPI_Waitsome_interruptible of an embodiment hereunder complies with an MPI standard MPI_Waitsome routine in that the interruptible wait routine behaves like the familiar MPI_Waitsome routine if the interruptible wait routine is not interrupted, and also has the same function signature as the familiar MPI_Waitsome routine.

During a memory configuring step 346, a memory medium 112 is configured by an association routine 226, 228, by an enhanced completion-awaiting routine 202, and/or otherwise in connection with an asynchronous callback and/or interruptible wait MPI enhancement as discussed herein.

The foregoing steps and their interrelationships are discussed in greater detail below, in connection with various embodiments.

Some embodiments provide an asynchronous callback enhancement process which includes a thread making 302 a non-blocking request to a message passing interface library, and associating 304 a callback routine with the request as an asynchronous callback to the thread.

The thread is a user-mode thread in some embodiments, e.g., in an architecture 214 which includes a user-mode MPI library 126. In some embodiments, the thread is not a user-mode thread. For example, kernel mode MPI libraries may be used, and in some environments a distinction is not made or is not enforced between user mode and kernel mode; this may occur, e.g., in some embedded systems, or in some systems in which applications are fully trusted.

In some embodiments, the process includes the thread transitioning 306 state. For example, the thread may transition from a closed state in which the thread will not process an asynchronous callback to an open state in which the thread will process an asynchronous callback, or vice versa. The familiar APC alertable state is an example of an "open state", but an embodiment may also use another open state 232.

In some embodiments, the thread (denoted herein as thread X) is accompanied by another thread, and the process further includes the other thread detecting 310 that the request is complete, and then queueing 312 the callback routine for execution by thread X. This may be combined with a state 232 condition, such that a thread other than thread X causes the callback routine to be queued for execution by thread X when thread X is in the open state.

In some embodiments, making 302 the non-blocking request includes invoking 316 a message passing interface library non-blocking routine 318 which is configured to return a messaging request. The routine 318 may be, for example, one of the following: an MPI non-blocking regular send routine, an MPI non-blocking synchronous send routine, an MPI non-blocking ready send routine, an MPI non-blocking buffered send routine, an MPI non-blocking receive routine, an MPI non-blocking generalized request routine, an MPI non-blocking I/O request routine. MPI_Issend( ) is an example of an MPI non-blocking synchronous send routine, but embodiments are not necessarily limited to a particular version or implementation of the set of potential MPI libraries 126. In some embodiments, the non-blocking send routine may be any MPI non-blocking routine that returns an MPI_Request, in that requests 212 can be applied to functionality such as connection establishment, both on the connecting and accepting process.

In some embodiments, the step of associating 304 a callback routine is performed at least in part by invoking 320 a broad routine 226 which is configured to associate callback routines for any of several different message passing interface library routines, each of which is configured to perform a particular messaging operation. For instance, a routine 226 MSMPI_Request_set_apc( ) may be invoked 320 during a process, as opposed to invoking 322 a routine 228 MSMPI_Isend_apc( ).

In some cases, associating 304 a callback routine is performed as a result of invoking 322 a message passing interface library narrow routine 228 which is also configured to perform a particular messaging operation. That is, in some embodiments, the step of associating a callback routine is performed at least in part by invoking a routine which is configured both to associate callback routines and also to perform a particular messaging operation. Some embodiments include both kinds of invocation 320, 322.

In particular, some embodiments include a narrow special APC callback version of Isend and Irecv, while others include a broad function by which one can set an APC callback for an arbitrary non-blocking request 212. With the broad routine, one can initiate other types of send requests (Issend, Irsend, etc.), as well as initiate MPI-IO requests, and then associate the APC callback with them. The difference in source code in one particular example would be to execute

```
MPI_Irecv( ..., &req )
MSMPI_Request_set_apc( &req, cb_fn, cb_stat )
instead of
MSMPI_Irecv_apc( ..., cb_fn, cb_stat, ..., &req )
```

In one embodiment, the interface for this broad routine 226 call in MSMPI looks like:

```
int
MPIAPI
MSMPI_Request_set_apc(
    in MPI_Request request,
    in MSMPI_Request_callback* callback_fn,
    in MPI_Status* callback_status
);
```

Some embodiments provide a process for asynchronous callback driven messaging request completion notification, which includes a user-mode thread making 302 a non-blocking request to a message passing interface library, associating 304 a callback routine with the request as an asynchronous callback to the thread, and queueing 312 the callback routine for execution by the thread which made the non-blocking request.

In some embodiments, the process further includes executing 314 the callback asynchronously in the thread. In some, the queuing 312 step occurs in response to another thread detecting 310 that the request is complete.

In some embodiments, making 302 the non-blocking request includes invoking an MPI non-blocking send routine and/or an MPI non-blocking receive routine. In some, making 302 the non-blocking request includes invoking an MPI non-blocking I/O request routine and/or an MPI non-blocking generalized request routine.

Figure 4:
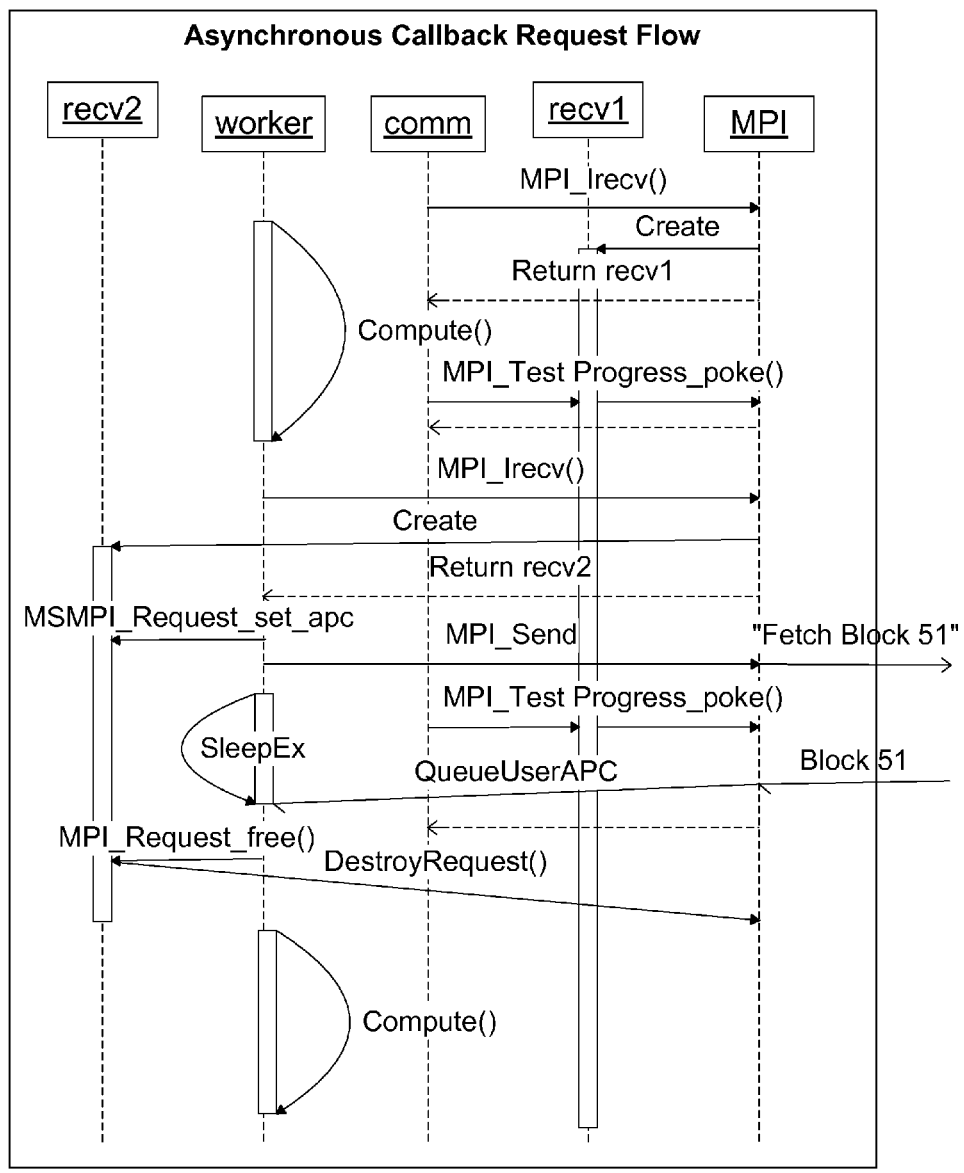
FIG. 4 is a sequence diagram illustrating interaction flow for an asynchronous callback request in some embodiments.
Figure 5:
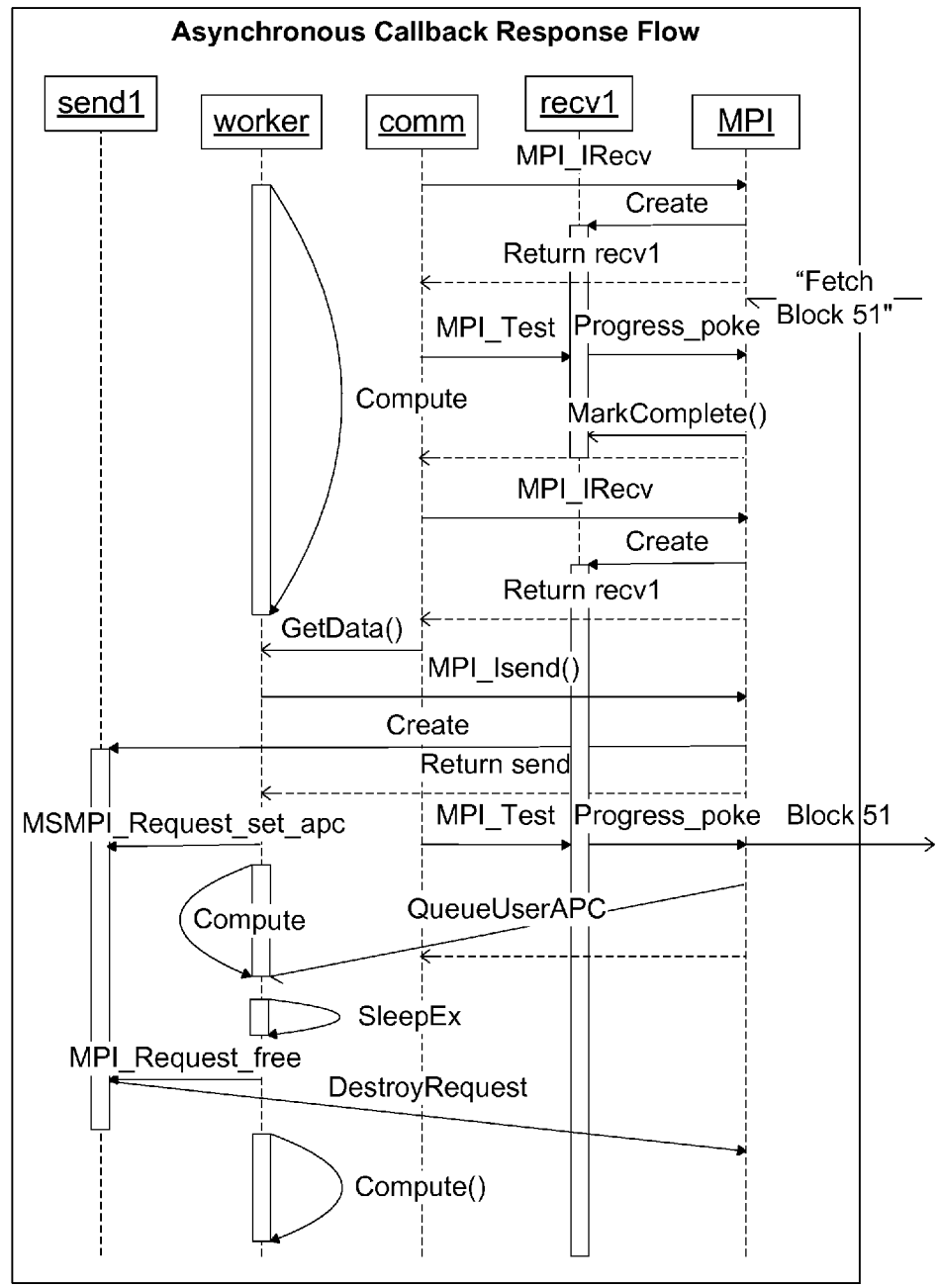
FIG. 5 is a sequence diagram illustrating interaction flow for an asynchronous callback response in some embodiments.
Figure 6:
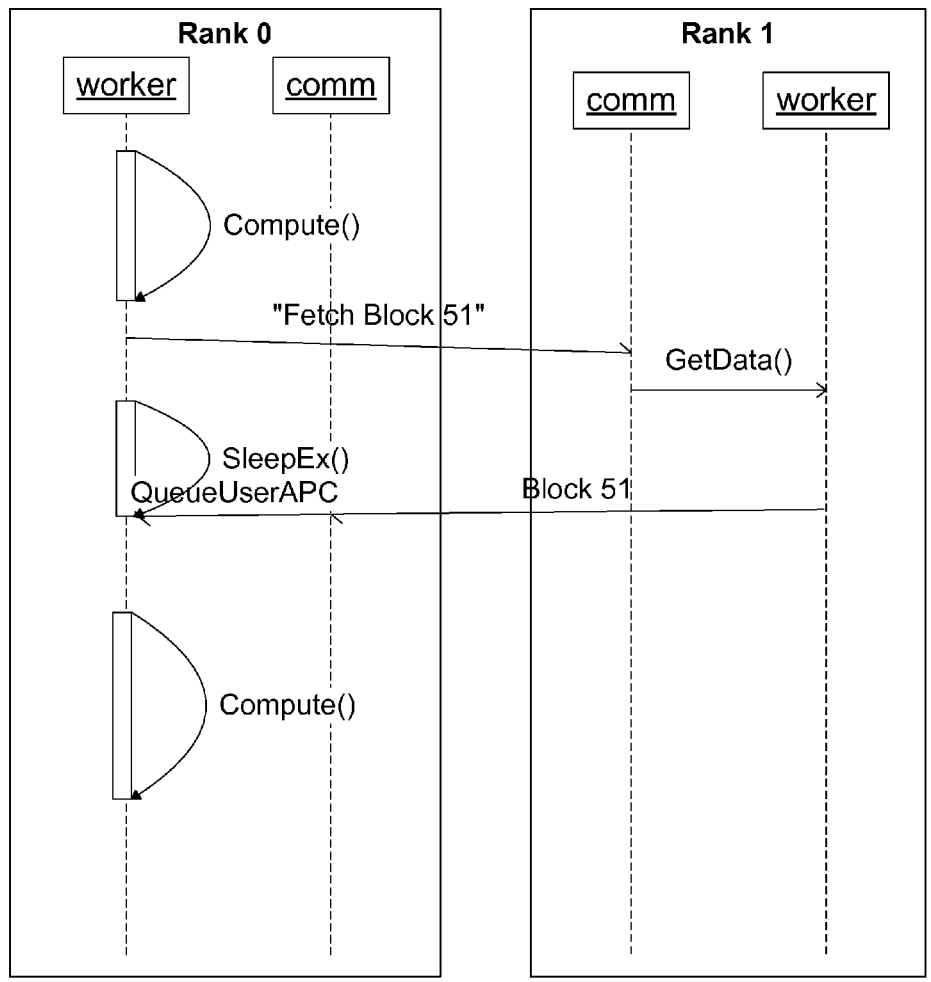
FIG. 6 is a sequence diagram illustrating interaction between ranks of an application in some embodiments.

In some embodiments, the asynchronous callback process includes a user-mode communication thread 216 making 302 a non-blocking request to a message passing interface library, associating 304 a callback routine with the request as an asynchronous callback to the thread, a user-mode worker thread 218 detecting 310 that the request is complete, and queueing 312 the callback routine for execution by the communication thread in response to the detecting step. In some embodiments, the process further includes the communication thread transitioning 306 to an open state in which the communication thread is open to processing asynchronous callbacks, and then executing 314 the callback asynchronously in the communication thread. By way of further example, FIGS. 4 and 5 show compute threads (also called worker threads) making non-blocking callback-driven requests, rather than communication threads doing so.

Some embodiments provide an interruptible wait process in which a communication thread 216 makes a wait-some interruptible call to MPI, namely, to an MPI library wait-some routine. Processing occurs in the MPI progress engine 132. At some point, a compute thread 218 interrupts 332 the wait-some routine, and the wait-some routine returns 334 to the communication thread indicating 210 zero completions.

Figure 7:
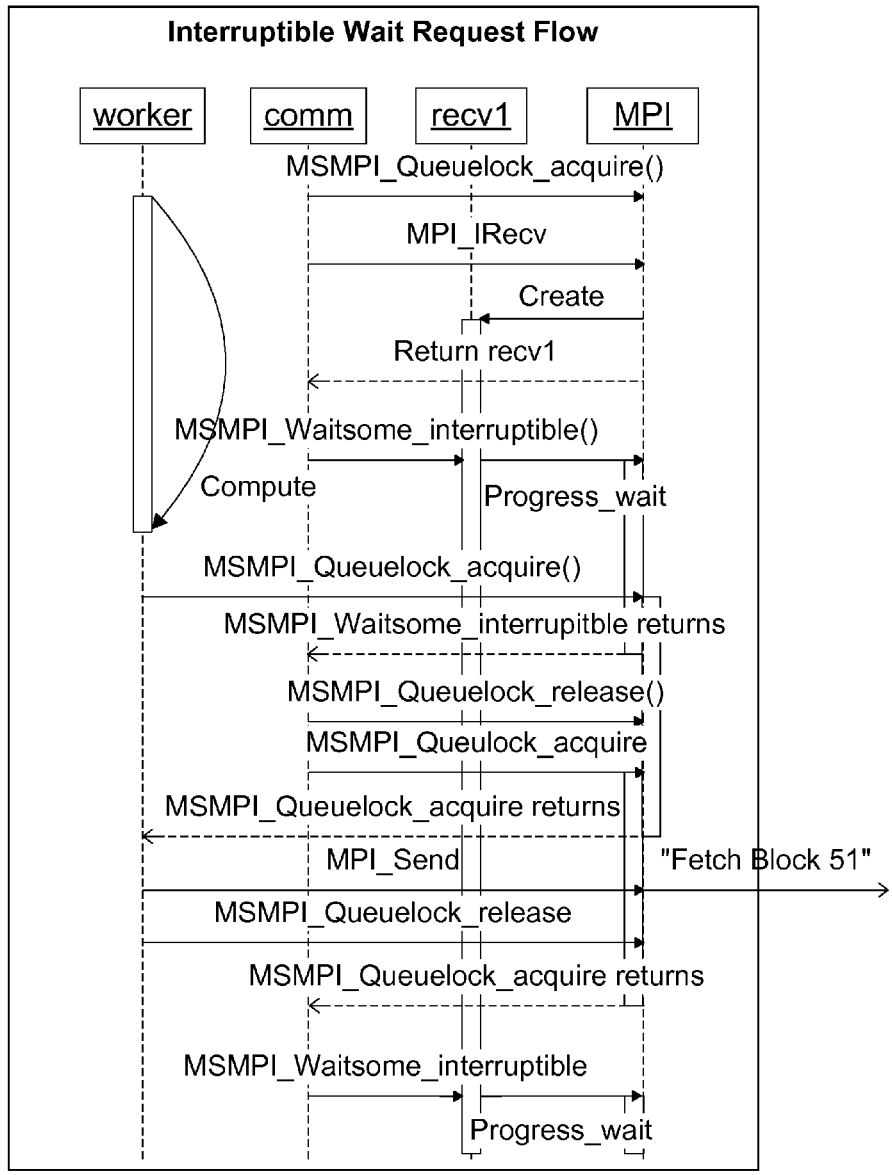
FIG. 7 is a sequence diagram illustrating interaction flow for an interruptible wait request in some embodiments.
Figure 8:
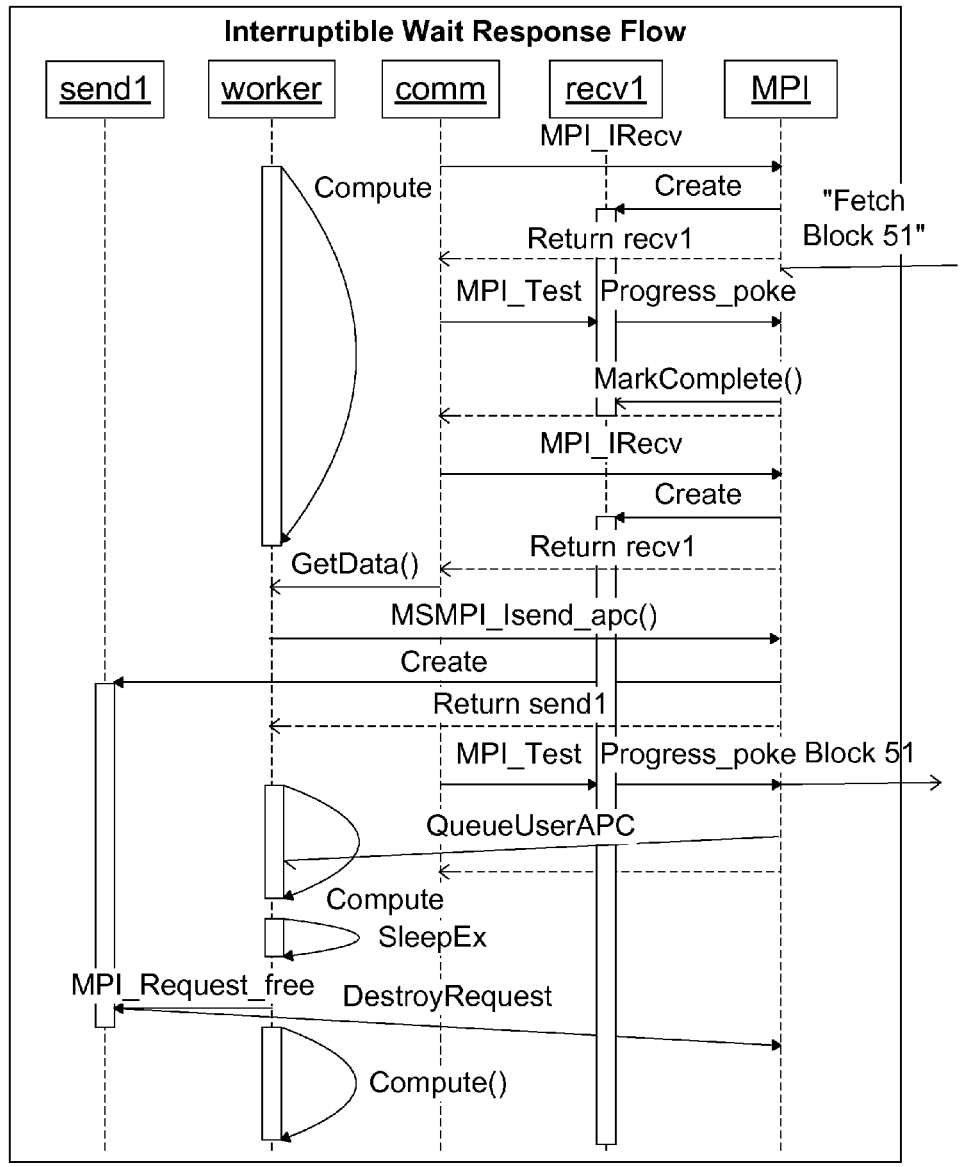
FIG. 8 is a sequence diagram illustrating interaction flow for an interruptible wait response in some embodiments.

Some embodiments provide an interruptible wait process enhancement in which a thread X calls 326 a completion-awaiting routine of a message passing interface library. The called completion-awaiting routine is configured (by data and/or instruction structure therein) to return successfully from a blocked condition after a specified message passing completion condition 204 is satisfied. The completion condition specifies 328 a list 206 of messaging operation(s) which have not yet been completed. For example, thread X could be a communication thread calling MSMPI_Waitsome_interruptible( ) as in the example of FIG. 7. Continuing the process, a message passing interface library progress engine executes 330 while the completion-awaiting routine is in the blocked condition. A thread Y interrupts 332 the completion-awaiting routine prior to satisfaction of the completion condition.

In some embodiments, the process further includes the interrupted completion-awaiting routine returning 334 control to thread X in conjunction with an indication 210 that none of the listed messaging operations have completed. In this context, "in conjunction with" means by use of a parameter, a function result, a global variable, or another data transfer mechanism.

In some embodiments, the completion-awaiting routine 202 is a wait-some routine, e.g., an enhanced MPI_Waitsome routine of the "wait-family" described above. The wait-some routine has a list 206 of requests, such as message passing operations, and is configured to return from the blocked condition after a completion of processing occurs on at least one of the listed requests. Within the list of requests 212, some requests may be message passing requests (e.g., send/recv), some may be I/O requests (e.g., read/write to file), some may be generalized requests, and some may be other requests such as connection related requests (e.g., connect/accept/spawn).

In some embodiments, a thread Y interrupts the completion-awaiting routine in conjunction with requesting 336 a lock 222 held by the thread X. For instance, a side effect of an MSMPI_Queuelock_acquire routine (discussed herein and illustrated in FIG. 7) is an interruption 332 of any outstanding MSMPI_Waitsome_interruptible call. The phrase "in conjunction with" here is intended to allow separate procedure calls, as when queuelock is a separate routine, and also to allow an integrated approach, as when sync is not factored out into queuelock but is instead part of each MSMPI_wait* function. Some embodiments separate the interruption functionality from the locking, leaving all synchronization to the application. This may involve multiple separate locks being acquired and released in a particular order by the application to provide FIFO ordering. An alternative approach is use of queuelock functionality which encapsulates the FIFO lock management, easing the application developer's effort.

More generally, some embodiments utilize 338 a lock 222 for serializing thread calls to the message passing interface library 126. As noted, "lock" is defined broadly herein, with several examples above. As another lock example, atomically incrementing an integer can be used as a synchronization mechanism in an implementation of a lock 222.

In some embodiments, an interruptible wait process is performed in an MPI architecture 214 in which thread X is a communication thread 216 and thread Y is one of multiple worker threads 218. In some, the process is performed in an MPI architecture which complies 342 with at least one of the following standards 344: MPI_THREAD_FUNNELED, MPI_THREAD_SERIALIZED.

Some embodiments provide a process for interruptible blocking wait in a messaging architecture. The process includes a thread X calling 326 a completion-awaiting routine of a message passing interface library 126. The called completion-awaiting routine is configured to return successfully from a blocked condition after a specified message passing completion condition 204 is satisfied. The completion condition specifies a list of messaging operation(s) which have not yet been completed. A message passing interface library progress engine 132 executes 330 while the completion-awaiting routine is in the blocked condition. At some point, a thread Y interrupts 332 the completion-awaiting routine prior to satisfaction of the completion condition, and the interrupted completion-awaiting routine returns 334 control to thread X in conjunction with an indication 210 that the completion condition is unsatisfied.

In some embodiments, the completion-awaiting routine completion condition 204 specifies non-blocking requests 212, and in some it specifies messaging operations 208. In some embodiments, the completion-awaiting routine completion condition 204 specifies that at least one messaging operation 208 in the list of messaging operation(s) has completed; similarly, it may specify that at least one non-blocking request in the list 206 has completed. In some cases, the condition 204 specifies that exactly one request/messaging operation in the list has completed. In some cases, the condition 204 specifies that multiple requests/operations in the list have completed, and in some it specifies that multiple list members, including every request/messaging operation in the list 206, have completed.

In some embodiments, the indication 210 that the completion condition is unsatisfied specifies how many requests/messaging operation(s) in the list had completed when thread Y interrupted the completion-awaiting routine.

In some embodiments, thread Y interrupts 332 the completion-awaiting routine in conjunction with requesting 336 a lock held by thread X. In some, the process includes utilizing 338 a FIFO lock for serializing thread calls to the message passing interface library.

In some embodiments, the completion-awaiting routine 202 has the same function signature as a standard MPI waitsome routine.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media as opposed to propagated signal media. The storage medium which is configured may be in particular a removable storage medium 114 such as a CD, DVD, or flash memory. A general-purpose memory, which may be removable or not, and may be volatile or not, can be configured into an embodiment using items such as enhanced MPI routines 202, callback association routines 226, 228, and code 126, 214 for performing asynchronous callback and/or interruptible wait processes described herein, in the form of data 118 and instructions 116, which are read from a removable medium 114 and/or another source such as a network connection, to form a configured medium. The configured medium 112 is capable of causing a computer system to perform process steps for transforming data through asynchronous callback and/or interruptible wait enhancements as disclosed herein. FIGS. 1 through 3 thus help illustrate configured storage media embodiments and process embodiments, as well as system and process embodiments. In particular, any of the process steps illustrated in FIG. 3, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and function signatures, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

The following discussion and accompanying FIGS. 4-8 are derived in part from prototype MSMPI documentation. MSMPI includes MPI library 126 code implemented by Microsoft Corporation, and illustrates an MPI architecture 214. Aspects of the MSMPI code and/or documentation are consistent with or otherwise illustrate aspects of the embodiments described herein. However, it will be understood that MSMPI documentation and/or implementation choices do not necessarily constrain the scope of such embodiments, and likewise that MSMPI and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Note also that the MSMPI documentation may contain preliminary information or inaccuracies, and may not correctly represent any associated Microsoft® product as commercially released. The documentation is provided "as is", and to the extent permitted by law, Microsoft makes no warranty of any kind, disclaims all express, implied and statutory warranties, and assumes no liability for any damages of any type in any connection with the documentation.

Some MSMPI documentation is referred to for convenience under the rubric MPI_THREAD_MOSTLY_SERIALIZED. Some MSMPI functionality may improve scalability and performance of hybrid MPI/multi-thread applications by allowing them to make strong progress without the potential for deadlock.

In the context of MPI standard concepts MPI_THREAD_FUNNELED, MPI_THREAD_SERIALIZED, and MPI_THREAD_MULTIPLE, noted in a table above, and message flow which spans across nodes as well as threads, also above, the documentation states that interruptible wait functionality provides APIs to manage locking semantics between multiple threads, an interruptible wait function allowing the communication thread to make strong progress (i.e., spend more time in the MPI progress engine rather than polling via MPI_Iprobe or MPI_Test*), and a pair of send and receive functions that indicate completion via APC callbacks. These enhancements can reduce the need for the intra-thread message queues, increase the communication thread's efficiency, and allow compute threads to initiate MPI data transfers directly, thereby yielding better scalability and better performance than a traditional design.

Some enhancements provide API signatures 130 that allow multiple threads to serialize access to MPI, allow compute threads to initiate MPI message transfers directly (bypassing any intra-thread message queueing for explicit data transfers), and allow compute threads to receive notifications of message transfer completions directly (bypassing any intra-thread message queueing for explicit data transfers). As a result, a typical message flow between nodes A, B and threads X (a communication thread), Y and Z becomes A:Z→B: X→B:Y→A:Z.

In some cases a wait function MSMPI_Waitsome_interruptible is available which allows an application to make strong progress without the potential for deadlock. To complement this function, and to allow the client application to interrupt an outstanding call to MSMPI_Waitsome_interruptible, synchronization functions are provided: MSMPI_Queuelock_acquire and MSMPI_Queuelock_release. These allow applications to easily implement proper serialization to MPI calls between threads. A side effect of MSMPI_Queuelock_acquire is that it interrupts any outstanding MSMPI_Waitsome_interruptible call. This design allows the messaging thread in the application to make strong progress, while allowing compute threads to force the messaging thread to break out of the wait in order to initiate data transfers in a timely manner.

With respect to detailed design in MSMPI, the following is presented.

MSMPI_Lock_queue

The MSMPI_Lock_queue structure is an opaque structure that describes a queued lock 222. The client application 120 allocates the MSMPI_Lock_queue structure, and passes it to MSMPI_Queuelock_acquire to acquire the queued lock. Those routines initialize the structure to represent the thread's position in queued lock. The client application passes the same structure to MSMPI_Queuelock_release when releasing the lock, and the structure remains resident in memory as long as the lock is held. Each call to MSMPI_Queuelock_acquire provides a distinct MSMPI_Lock_queue structure as input. The MSMPI_Lock_queue structure cannot be shared between threads.

MSMPI_Queuelock_acquire

This routine acquires the global MSMPI serialization lock. The lock guarantees FIFO ordering for callers, and interrupts any in-progress interruptible wait calls.
Syntax:

```
void
MPIAPI
MSMPI_Queuelock_acquire(
    in MSMPI_Lock_queue* queue
    );
```

Parameters:
queue
Pointer to an MSMPI_Lock_queue structure used to represent the caller in the lock queue. This structure is to remain valid until a matching call to MSMPI_Queuelock_release, and is not to be shared between callers.
Return Value:
This function does not return a value.
Remarks:
This function is threadsafe, and can be used to implement proper MPI_THREAD_SERIALIZED usage by multiple threads. The lock can only safely be acquired recursively in a MPI_THREAD_MULTIPLE environment.
MSMPI_Queuelock_release Releases the global MSMPI serialization lock 222. The lock guarantees FIFO ordering for callers.
Syntax:

```
void
MPIAPI
MSMPI_Queuelock_acquire(
    in MSMPI_Lock_queue* queue
    );
```

Parameters:
queue
Pointer to an MSMPI_Lock_queue structure used to represent the caller in the lock queue in the matching call to MSMPI_Queuelock_acquire.
Return Value:
This function does not return a value.
Remarks:
Clients only call this function after a successful call to MSMPI_Queuelock_acquire, and pass the same queue parameter that was used in the call to MSMPI_Queuelock_acquire.
MSMPI_Request_callback
Defines the function type for the callback invoked via APC when a request completes.
Syntax:

```
typedef void
(MPIAPI MSMPI_Request_callback)(
    in MPI_Status* status
    );
```

Parameters:
status [in]
Pointer to MPI_Status structure specified in the call to MSMPI_Isend_apc or MSMPI_Irecv_apc, filled in with completion information for the request.
Return Value:
This function does not return a value.
Remarks:
Clients are to call MPI_Request_free in their callback, or after the callback is executed, to release the request object. As to obtaining the request to free, note there is only a single parameter to the callback. If one wants extra context, one can define a structure that contains the MPI_Status as well as any other desired information. One can then use CONTAINING_RECORD to get to this structure and access the other members.
MSMPI_Waitsome_interruptible
Waits for some of the input requests to complete, but can be interrupted by another thread calling MSMPI_Queuelock_acquire.
Syntax:

```
int
MPIAPI
MSMPI_Waitsome_interruptible(
    in int incount,
    inout_ecount(incount) MPI_Request* array_of_requests,
    out int* outcount,
    out_ecount_part(incount,*outcount) int* array_of_indices,
    out_ecount_part(incount,*outcount) MPI_Status* array_of_statuses
    );
```

Parameters:
Identical usage as with MPI_Waitsome.
Return Value:
MPI_SUCCESS if the call is successful
Other MPI error value if the call fails.
Remarks:
This function behaves in some regards identically to MPI_Waitsome, with the additional behavior that the function can return MPI_SUCCESS with outcount set to 0 if the call was interrupted by another thread calling MSMPI_Queuelock_acquire.
Callers are expected to call MSMPI_Queuelock_acquire before calling this function, and must call MSMPI_Queuelock_release when this function returns outcount==0 in order to allow other threads to run.
MSMPI_Isend_apc
Starts a non-blocking send that will complete via an APC callback to the requesting thread.
Syntax:

```
int
MPIAPI
MSMPI_Isend_apc(
    ___in void* buf,
    ___in int count,
    ___in MPI_Datatype datatype,
    ___in int dest,
    ___in int tag,
    ___in MSMPI_Request_callback* callback_fn,
    ___in MPI_Status* callback_status,
    ___in MPI_Comm comm,
    ___out MPI_Request* request
);
```

Parameters:
buf, count, datatype, dest, tag, comm, request
  Identical usage as with MPI_Isend.
callback_fn [in]
  The callback function to invoke when the request completes.
callback_status [in]
  The status to pass to the callback when the request completes, indicating completion information.
Return Value:
MPI_SUCCESS if the call is successful
Other MPI error value if the call fails.
Remarks:
Applications are not to exit threads that have pending MSMPI_Isend_apc requests outstanding until the request completes and the APC callback is invoked. Doing so leaks a reference to the requesting thread until the application terminates, and will cause an error to be reported when MSMPI fails to queue the APC callback. Applications can cancel outstanding requests using MPI_Request_cancel as with any other non-blocking request. Applications that make blocking MPI calls from a thread with APC requests outstanding may execute the APC callback while in the context of the blocking MPI call. MSMPI will support applications making MPI calls from the APC callback. However, applications are to be careful about nesting APC callbacks too deeply and running out of thread stack space.
MSMPI_Irecv_apc
Starts a non-blocking receive that will complete via an APC callback to the requesting thread.
Syntax:

```
int
MPIAPI
MSMPI_Irecv_apc(
    ___out void* buf,
    ___in int count,
    ___in MPI_Datatype datatype,
    ___in int source,
    ___in int tag,
    ___in MSMPI_Request_callback callback_fn,
    ___in MPI_Status* callback_status,
    ___in MPI_Comm comm,
    ___out MPI_Request* request
);
```

Parameters:
buf, count, datatype, source, tag, comm, request
  Identical usage as with MPI_Irecv.
callback_fn [in]
  The callback function to invoke when the request completes.
callback_status [in]
  The status to pass to the callback when the request completes. The status is updated with completion information before the callback is invoked. Memory for this structure is to remain valid until the request completes.
Return Value:
MPI_SUCCESS if the call is successful
Other MPI error value if the call fails.
Remarks:
Applications are not to exit threads that have pending MSMPI_Irecv_apc requests outstanding until the request completes and the APC callback is invoked. Applications can cancel outstanding requests using MPI_Request_cancel as with any other non-blocking request. Applications that make blocking MPI calls from a thread with APC requests outstanding may execute the APC callback while in the context of the blocking MPI call. MSMPI will support applications making MPI calls from the APC callback. However, applications are to be careful about nesting APC callbacks too deeply and running out of thread stack space.
As to logging, the foregoing MSMPI APIs will follow the same tracing logic as existing MPI APIs.

With further attention to asynchronous callback enhancements, some MSMPI documentation notes in the context recited above regarding MPI standard support for multiple levels of threading in MPI implementations (MPI_THREAD_FUNNELED etc.) that one threading pattern implemented by several HPC applications has a single messaging thread in charge of making MPI calls (effectively MPI_THREAD_FUNNELED.) The application then implements message queues between compute threads and the messaging thread to allow incoming messages to be dispatched to compute threads as well as to allow compute threads to queue requests to be sent and received via MPI by the messaging thread.

To effectively overlap communication with computation, some applications use non-blocking MPI requests, generally initiated via MPI_Isend and MPI_Irecv. The application then explicitly waits for completion of the requests via a call to MPI_Wait, MPI_Test, or one of their variants.

Some embodiments introduce non-blocking send and receive functions 228, MSMPI_Isend_apc and MSMPI_Irecv_apc, that avoid waiting for completion explicitly. Instead, any thread making progress that completes an outstanding APC request causes an APC to be queued 312 to the initiating thread. The APC executes outside of the context of any MPI call whenever the requesting thread enters an alertable state 232.

As further examples, one has the following normal use case and an erroneous use case:

Normal Use Case:

| Thread 1 | Thread 2 |
|---|---|
| MSMPI_Isend_apc(req1) | ... |
| SleepEx(INFINITE, alertable = TRUE) | MPI_Iprobe |
| ... | [MPI_Iprobe makes progress on req1, it completes, and an APC is queued. |
| APC runs, then SleepEx returns | ... |
| MPI_Request_free(req 1) | |

Erroneous Use Case:

| Thread 1 | Thread 2 |
|---|---|
| MSMPI_Isend_apc(req1) | ... |
| ExitThread | MPI_Iprobe |
| | [MPI_Iprobe makes progress on req1, it completes, and an APC fails to be queued because thread exited. MPI_Iprobe fails ... |

As to error handling, standard MPI error handling can be applied to these MSMPI functions. An error queuing the APC would result in an error being reported by the function that tried to queue the APC (the function that detected the request completion, generally MPI_Wait or one of its derivatives.)

As to logging, the enhanced APIs would be integrated into the usual MSMPI tracing. As to setup and upgrade, existing MPI interfaces remain unchanged in behavior. No backward compatibility issues arise, as no existing APIs are modified in this particular implementation.

As to performance and scale, because the requesting thread is notified implicitly by MSMPI queuing an APC, the messaging thread avoids explicit wait for such requests. The messaging thread is also relieved of the duty of dispatching request completion notifications to the appropriate thread, reducing code complexity, and allowing it to spend more of its CPU cycles making progress on other MPI requests. Overall message rates for a multi-threaded app that uses the new functions may improve. Some additional logic is present when requests are creating (zero-ing an additional member), and an extra conditional branch in the request completion path to queue the APC. Both of these would impact non-APC requests. Request creation and completion code paths are modified, so testing (e.g., pingpong and message rate tests) could be done to see whether applications using the standard MPI routines regress.

FIGS. 4 through 8 illustrate usage of MSMPI routines. As an additional example, the following usage model is provided:

| Communication Thread | Compute Thread |
|---|---|
| MSMPI_Queuelock_acquire | ... (compute) |
| MPI_Irecv(req1) | ... (compute) |
| MSMPI_Waitsome_interruptible(req1) | ... (compute) |
| ... (in progress engine) | MSMPI_Queuelock_acquire |
| [wait is interrupted] | ... (spinning) |
| MSMPI_Queuelock_release | ... (spinning) |
| MSMPI_Queuelock_acquire | MPI_Send |
| ... (spinning) | MSMPI_Irecv_apc(req2) |
| ... (spinning) | MSMPI_Queuelock_release |
| MSMPI_Waitsome_interruptible(req1) | SleepEx(INFINITE, alretable = TRUE) |
| [req1 completes] | ... (sleeping) |
| MSMPI_Queuelock_release | ... |
| [dispatch req1] | ... |
| MSMPI_Queuelock_acquire | ... |
| MPI_Irecv(req1) | ... |
| MSMPI_Waitsome_interruptible(req1) | ... |
| [req2 completes, queues APC to thread 2] | ... |
| ... (in progress engine) | APC runs |
| ... (in progress engine) | MSMPI_Queuelock_acquire |
| [wait is interrupted] | ... (spinning) |
| MSMPI_Queuelock_release | ... (spinning) |
| MSMPI_Queuelock_acquire | MPI_Request_free(req2) |
| ... (spinning) | MSMPI_Queuelock_release |
| MSMPI_Waitsome_interruptible(req1) | ... (process received data) |

In this example, req1 serves to handle incoming requests from other processes. This would have a different tag from req2, which serves to receive the response to the request sent by the MPI_Send call. The communication thread does not use the req2 handle, so one avoids the intra-thread communication. Note that the [dispatch req1] step could be done by queueing one's own APC to that thread if the target is a compute thread that might be sleeping. Note also that the queue parameter to MSMPI_Lockqueue_acquire is to be passed to the corresponding MSMPI_Lockqueue_release call.

From an architectural perspective, one queue lock implementation will parallel the kernel's in-stack queued spinlock functionality. Specifically, there will be a global 'tail' pointer for the queue, set to NULL if the queue is empty, or to the address of the MSMPI_Lock_queue entry currently at the tail. This allows using InterlockedExchangePointer to test for NULL as well as queueing entries. When a thread calls MSMPI_Waitsome_interruptible, a global flag is set indicating that a thread is in that function. This allows a future call to MSMPI_Queuelock_acquire to signal the thread by queueing a completion to the progress engine IOCP, interrupting the wait call. APCs are not used for waking up the thread from the completion port because one might be alerted due to an APC request completing, and then execute the APC callback while still in the context of an MPI call. Care will be taken to delay executing user APC requests if one ever moves to using APCs internally until unwinding.

A challenging code flow is the following:
MSMPI_Queuelock_acquire
MSMPI_Isend_apc(req1)
MPI_Irecv(req2)
MSMPI_Waitsome_interruptible(req2)
[req1 completes, queue APC]
[APC executes, causes wait to be aborted]
MSMPI_Queuelock_release
SleepEx(INFINITE) [waiting for req1 APC]←DEADLOCK
Alternatively, if the user's APC attempts to perform MPI operations, and calls MSMPI_Queuelock_acquire, it will deadlock.

In one example, MSMPI_Queuelock_acquire implements the following pseudocode:

```
MSMPI_Queuelock_acquire( queue )
{
    queue->next = NULL
    oldTail = InterlockedExchangePointer( &g_pLockTail, queue )
    if( oldTail == NULL ) return MPI_SUCCESS;
```

```
    queue->waiting = TRUE;
    oldTail->next = &queue
    if( InterlockedBitTestAndSet( g_interruptWaitFlag ) &&
g_fWaiter == TRUE )
    {
        ExPostCompletion( EX_WAIT_INTERRUPT )
    }
    loop while( queue->waiting )
    return MPI_SUCCESS
}
```

In this example, MSMPI_Queuelock_release implements the following pseudocode:

```
MSMPI_Queuelock_release( queue )
{
    if( queue->next == NULL )
    {
        oldTail =
            InterlockedCompareExchangePointer( &g_pLockTail,
    NULL, queue )
        if( oldTail == queue ) return
        loop while( queue->next == NULL )
    }
    queue->next->waiting = FALSE;
}
```

In this example, the interruptible progress loop implements the following pseudocode:

```
do
{
    while( spin limit not reached )
    {
        if SHM request completion, return request status
        if ND request completion, return request status
        if slow_tick or interrupted, check IOCP for request
completion, and if found return status
        if interrupted, return MPI_ERR_PENDING
    }
    if( blocking or interruptible )
    {
        enable SHM completion notification
        enable ND completion notification
        GetQueuedCompletionStatus( INFINITE )
        if( interruptible && key == EX_WAIT_INTERRUPT )
        return MPI_ERR_PENDING
    }
} while( no completion && (blocking || interruptible) );
```

In this example, MSMPI_Waitsome_interruptible implements the following pseudocode:

```
poke progress engine to attempt to make minimal progress
g_fWaiter = TRUE
if( g_interruptWaitFlag is set )
{
    clear g_interruptWaitFlag
    clear g_fWaiter
    outcount = 0
    return MPI_SUCCESS;
}
normal waitsome logic, except blocking progress call is
    replaced with interruptible progress loop:
if( interruptible progress loop == MPI_ERR_PENDING )
{
    clear g_interruptWaitFlag
    clear g_fWaiter
    outcount = 0
    return MPI_SUCCESS;
}
```

Conclusion

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 through 8 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process comprising the steps of:
a thread X in an application calling an interruptible completion-awaiting routine of a message passing interface (MPI) library, the called interruptible completion-awaiting routine being configured to return successfully from a blocked condition after a specified message passing completion condition is satisfied, the completion condition specifying a list of requests which have not yet been completed;
a message passing interface library progress engine executing while the interruptible completion-awaiting routine is in the blocked condition;
a thread Y interrupting the interruptible completion-awaiting routine prior to satisfaction of the completion condition; and
the interruptible completion-awaiting routine returning control in response to interruption by the thread Y, as part of an interruptible wait enhancement which (a) is not an asynchronous callback enhancement, (b) allows an interruption of the completion-awaiting routine without canceling the completion-awaiting routine, and wherein the interruptible completion-awaiting routine returns with a completion indicator which indicates that at least one of the listed requests was completed prior to the interruption and also indicates that at least one of the listed requests was not completed prior to the interruption, and (c) allows the application to make progress;
wherein the interruptible wait enhancement of the interrupted completion-awaiting routine returns control to the thread X in conjunction with an indication specifying that more than 1 and less than N messaging operations in the list of N messaging operations had completed when the thread Y interrupted the completion-awaiting routine, with N being an integer greater than 2.

2. The process of claim 1, wherein the interruptible wait enhancement of the interrupted completion-awaiting routine returns control to the thread X in conjunction with an indication of which of the listed requests completed prior to the interruption.

3. The process of claim 1, in which the interruptible completion-awaiting routine is a wait-some routine which has a list of non-blocking requests and wherein the interruptible wait enhancement returns control from the blocked condition after a completion of processing occurs on at least one of the listed requests.

4. The process of claim 1, wherein the thread Y interrupts the interruptible completion-awaiting routine in conjunction with requesting a lock held by the thread X.

5. The process of claim 1, further comprising utilizing a lock for serializing thread calls to the message passing interface library.

6. The process of claim 1, performed in an MPI architecture in which one of the thread X and the thread Y is a communication thread and the other of the thread X and the thread Y is one of multiple worker threads.

7. The process of claim 1, performed in an MPI architecture which complies with at least one of the following standards: MPI_THREAD_FUNNELED, MPI_THREAD_SERIALIZED.

8. A computer-readable storage memory configured with data and with instructions that when executed cause processor(s) to perform a process for interruptible blocking wait in a messaging architecture, the process comprising the steps of:
a thread X in an application calling an interruptible completion-awaiting routine of a message passing interface library, the called interruptible completion-awaiting routine being configured to return successfully from a blocked condition after a specified message passing completion condition is satisfied, the completion condition specifying a list of N messaging operations which have not yet been completed;
a message passing interface library progress engine executing while the interruptible completion-awaiting routine is in the blocked condition;
a thread Y interrupting the interruptible completion-awaiting routine prior to satisfaction of the completion condition; and
the interrupted completion-awaiting routine returning control to the thread X in conjunction with an indication that the completion condition is unsatisfied;
wherein the interruptible completion-awaiting routine returns control to the thread X in response to interruption by the thread Y as part of an interruptible wait enhancement which (a) is not an asynchronous callback enhancement, (b) allows an interruption of the completion-awaiting routine without canceling the completion-awaiting routine, and wherein the interruptible completion-awaiting routine returns with a completion indicator which indicates that at least one of the listed operations was completed prior to the interruption and also indicates that at least one of the listed operations was not completed prior to the interruption, and (c) allows the application to make progress;
wherein the interruptible wait enhancement of the interrupted completion-awaiting routine returns control to the thread X in conjunction with an indication specifying that more than 1 and less than N messaging operations in the list of N messaging operations had completed when the thread Y interrupted the completion-awaiting routine, with N being an integer greater than 2.

9. The computer-readable storage memory of claim 8, wherein the thread Y interrupts the interruptible completion-awaiting routine in conjunction with requesting a lock held by the thread X.

10. The computer-readable storage memory of claim 8, wherein the process further comprises utilizing a FIFO lock for serializing thread calls to the message passing interface library.

11. The computer-readable storage memory of claim 8, wherein the interruptible completion-awaiting routine has the same function signature as a standard MPI waitsome routine.

12. The computer-readable storage memory of claim 8, wherein the message passing interface library progress engine executes in an MPI architecture which complies with at least one of the following standards: MPI_THREAD_FUNNELED, MPI_THREAD_SERIALIZED.

13. The computer-readable storage memory of claim 8, wherein the process further comprises utilizing a lock for serializing thread calls to the message passing interface library.

14. A computer system comprising:
at least one logical processor, each logical processor in operable communication with a memory;
an application having at least two threads residing in the memory;
a message passing interface library progress engine residing in the memory;
an unsatisfied completion condition specifying a list of N requests which have not been completed; and
an interruptible completion-awaiting routine of a message passing interface library, the interruptible completion-awaiting routine configured to return successfully from a blocked condition in the absence of interruption and when the completion condition is satisfied, the completion-awaiting routine also configured to return control in response to an interruption as part of an interruptible wait enhancement which (a) is not an asynchronous callback enhancement, (b) allows an interruption of the completion-awaiting routine without canceling the completion-awaiting routine, and wherein the interruptible completion-awaiting routine returns with a completion indicator which indicates that at least one of the listed requests was completed prior to the interruption and also indicates that at least one of the listed requests was not completed prior to the interruption, and (c) allows the application to make progress;

wherein the interruptible wait enhancement of the interrupted completion-awaiting routine returns control to a thread X in conjunction with an indication specifying that more than 1 and less than N messaging operations in the list of N messaging operations had completed when a thread Y interrupted the completion-awaiting routine, with N being an integer greater than 2.

15. The system of claim 14, wherein one of the threads is a communication thread of an application having at least two processes, the other thread is a worker thread of the application, and each process comprises a communication thread and multiple worker threads.

16. The system of claim 14, further comprising a lock for use in serializing thread calls to the message passing interface library.

17. The system of claim 14, wherein the system comprises an MPI architecture which complies with at least one of the following standards:
MPI_THREAD_FUNNELED, MPI_THREAD_SERIALIZED.

18. The system of claim 14, wherein the completion-awaiting routine has the same function signature as a standard MPI routine.

19. The system of claim 14, further comprising a message passing interface library request residing in the memory and having a requesting thread identifier which identifies one of the threads.

20. The system of claim 14, wherein the system comprises an MPI architecture which complies with at least an MPI_THREAD_FUNNELED standard.

* * * * *